United States Patent
Lee et al.

(10) Patent No.: US 10,477,448 B2
(45) Date of Patent: Nov. 12, 2019

(54) METHODS AND APPARATUS FOR CELL RESELECTION WITH INTERFERENCE AVOIDANCE IN MOBILE COMMUNICATIONS

(71) Applicant: MediaTek Inc., Hsinchu (TW)

(72) Inventors: Tsung-Ming Lee, Hsinchu (TW); Chun-Pin Chen, Hsinchu (TW); I-Hsien Yeh, Hsinchu (TW); Nien-En Wu, Hsinchu (TW); Shiau-Tsung Chiu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/149,368

(22) Filed: Oct. 2, 2018

(65) Prior Publication Data

US 2019/0116537 A1 Apr. 18, 2019

Related U.S. Application Data

(60) Provisional application No. 62/573,185, filed on Oct. 17, 2017.

(51) Int. Cl.
*H04W 36/00* (2009.01)
*H04W 36/30* (2009.01)

(52) U.S. Cl.
CPC ....... *H04W 36/30* (2013.01); *H04W 36/0058* (2018.08); *H04W 36/00837* (2018.08)

(58) Field of Classification Search
CPC ........... H04W 36/30; H04W 36/00837; H04W 36/0058

USPC .......... 455/437, 436, 442, 450, 67.11, 67.14, 455/509

See application file for complete search history.

(56) References Cited

U.S. PATENT DOCUMENTS

| | | | |
|---|---|---|---|
| 9,699,712 B2 * | 7/2017 | Singh | H04W 48/16 |
| 2004/0022217 A1 * | 2/2004 | Korpela | H04W 36/0085 370/335 |
| 2010/0120426 A1 * | 5/2010 | Singh | H04W 48/12 455/435.1 |
| 2010/0202391 A1 * | 8/2010 | Palanki | H04W 72/0426 370/329 |
| 2010/0240371 A1 * | 9/2010 | Cook | H04W 36/00835 455/436 |
| 2010/0240373 A1 * | 9/2010 | Ji | H04W 36/08 455/436 |
| 2011/0110254 A1 * | 5/2011 | Ji | H04W 36/0066 370/252 |
| 2012/0108239 A1 * | 5/2012 | Damnjanovic | H04L 5/0073 455/436 |

(Continued)

*Primary Examiner* — Marceau Milord
(74) *Attorney, Agent, or Firm* — Han IP PLLC; Andy M. Han

(57) ABSTRACT

Various solutions for cell reselection with interference avoidance with respect to user equipment and network apparatus in mobile communications are described. An apparatus may receive frequency information of a target cell from a broadcast channel of a serving cell. The apparatus may determine an overlapped bandwidth region between the serving cell and the target cell according to the frequency information. The apparatus may compare a signal quality of the serving cell in the overlapped bandwidth region with a signal quality of the target cell in the overlapped bandwidth region. The apparatus may determine whether to perform a cell reselection according to a comparison result.

16 Claims, 5 Drawing Sheets

(56) References Cited

U.S. PATENT DOCUMENTS

| | | | |
|---|---|---|---|
| 2012/0129517 A1* | 5/2012 | Fox | H04L 41/5025 455/425 |
| 2013/0237227 A1* | 9/2013 | Nagaraja | H04W 16/10 455/436 |
| 2014/0247811 A1* | 9/2014 | Singh | H04W 36/0033 370/332 |
| 2015/0156685 A1* | 6/2015 | Singh | H04W 48/16 455/436 |

* cited by examiner

| CELL | CELL A | CELL B |
|---|---|---|
| PRIORITY | LOW | HIGH |
| INTERFERENCE | LOW | HIGH |
| RSRP | LOW | HIGH |
| CALL DROP RATE | 0 % | 99 % |

FIG. 1

| CELL | CELL A | CELL B |
|---|---|---|
| PRIORITY | HIGH | LOW |
| INTERFERENCE | HIGH | LOW |
| RSRP | HIGH | LOW |
| CALL DROP RATE | 99 % | 0 % |

FIG. 2

METHODS AND APPARATUS FOR CELL RESELECTION WITH INTERFERENCE AVOIDANCE IN MOBILE COMMUNICATIONS

CROSS REFERENCE TO RELATED PATENT APPLICATION(S)

The present disclosure is part of a non-provisional application claiming the priority benefit of U.S. Patent Application No. 62/573,185, filed on 17 Oct. 2017, the content of which is incorporated by reference in its entirety.

TECHNICAL FIELD

The present disclosure is generally related to mobile communications and, more particularly, to cell reselection with interference avoidance with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE), new radio (NR), or any other communication system, the user equipment (UE) may be configured to perform the cell selection/reselection based on some criteria. For example, the UE may perform the cell selection/reselection based on the cell selection receive (RX) level value (e.g., Srxlev) or the cell selection quality value (e.g., Squal). The cell selection/reselection may also be priority based. The cell selection/reselection condition may be different according to frequency priority.

On the other hand, the paging missing rate or the call drop rate may be highly correlated to the interference level on the serving cell. Once the interference level is greater than a threshold value, the UE may not be able to detect the paging signal or the received signals. The interference may occur under some network deployments. For example, two cells may be configured with a first central frequency f1 and a second central frequency f2 respectively. In a case that the first central frequency f1 is close to the second central frequency f2, a part of bandwidth of these two cells may be overlapped. The interference may occur due to the overlapped bandwidth. The paging missing rate or the call drop rate may rise due to the interference.

Accordingly, the UE should consider the interference or the overlapped bandwidth when choosing a cell to camp on. Therefore, it is needed to provide proper interference avoidance schemes when performing the cell selection/reselection procedure.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to cell reselection with interference avoidance with respect to user equipment and network apparatus in mobile communications.

In one aspect, a method may involve an apparatus receiving frequency information of a target cell from a broadcast channel of a serving cell. The method may also involve the apparatus determining an overlapped bandwidth region between the serving cell and the target cell according to the frequency information. The method may further involve the apparatus comparing a signal quality of the serving cell in the overlapped bandwidth region with a signal quality of the target cell in the overlapped bandwidth region. The method may further involve the apparatus determining, by the processor, whether to perform a cell reselection according to a comparison result.

In one aspect, an apparatus may comprise a transceiver capable of wirelessly communicating with a plurality of cells of a wireless network. The apparatus may also comprise a processor communicatively coupled to the transceiver. The processor may be capable of receiving frequency information of a target cell from a broadcast channel of a serving cell. The processor may also be capable of determining an overlapped bandwidth region between the serving cell and the target cell according to the frequency information. The processor may further be capable of comparing a signal quality of the serving cell in the overlapped bandwidth region with a signal quality of the target cell in the overlapped bandwidth region. The processor may further be capable of determining whether to perform a cell reselection according to a comparison result.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 is a diagram depicting an example scenario under schemes in accordance with implementations of the present disclosure.

FIG. 2 is a diagram depicting an example scenario under schemes in accordance with implementations of the present disclosure.

DETAILED DESCRIPTION OF PREFERRED IMPLEMENTATIONS

Figure 3:
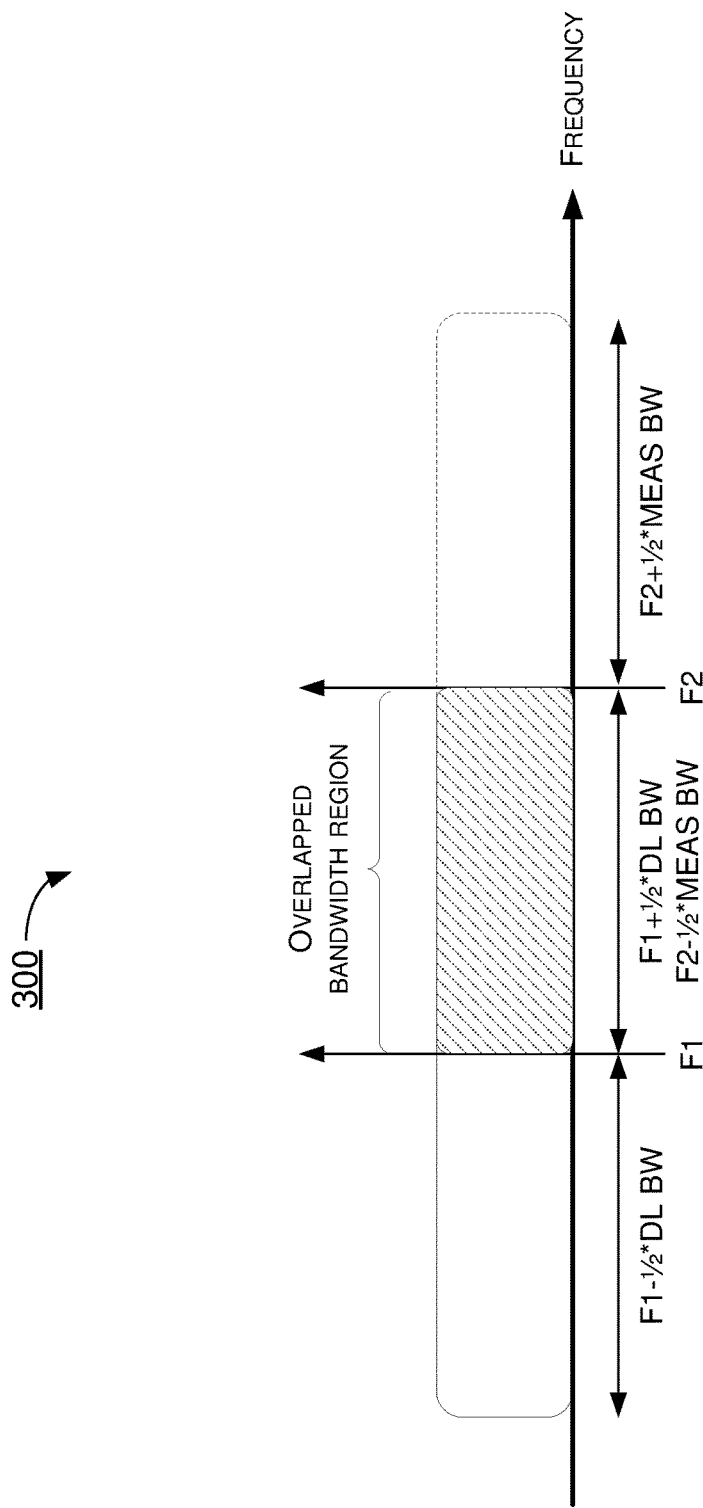
FIG. 3 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to cell reselection with interference avoidance with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE, the UE may be configured to perform the cell selection/reselection based on some criteria. For example, the UE may perform the cell selection/reselection based on the cell selection RX level value (e.g., Srxlev) or the cell selection quality value (e.g., Squal). The cell selection/reselection may also be priority based. The cell selection/reselection condition may be different according to frequency priority. On the other hand, the paging missing rate or the call drop rate may be highly correlated to the interference level on the serving cell. Once the interference level is greater than a threshold value, the UE may not be able to detect the paging signal or the received signals. The interference may occur under some network deployments. For example, two cells may be configured with a first central frequency f1 and a second central frequency f2 respectively. In a case that the first central frequency f1 is close to the second central frequency f2, a part of bandwidth of these two cells may be overlapped. The interference may occur due to the overlapped bandwidth.

FIG. 1 illustrates an example scenario 100 under schemes in accordance with implementations of the present disclosure. Scenario 100 involves a UE and a plurality of cells, which may be a part of a wireless communication network (e.g., an LTE network, an LTE-Advanced network, an LTE-Advanced Pro network, a 5G network, an NR network, an IoT network or an NB-IoT network). Cell A may be configured with a low priority and cell B may be configured with a high priority. The interference at cell A may be low and the interference at cell B may be high. The reference symbol received power (RSRP) received from cell A may be low and the RSRP received from cell B may be high. It is assumed that the call drop rate at cell A is 0% and the call drop rate at cell B is 99%. The call drop rate may rise in a case that the UE reselects to the cell with high interference. Assuming that the UE is configured to perform the cell reselection based on the RSRP, the UE may reselect to cell B since the RSRP of cell B is high and may meet the cell reselection criteria. However, the call drop rate at cell A is 0% while the call drop rate at cell B is 99%. In a case that the UE reselects to cell B, the UE may suffer from the high interference and the high call drop rate. For better user experience, the UE should stay at cell A under scenario 100.

FIG. 2 illustrates an example scenario 200 under schemes in accordance with implementations of the present disclosure. Scenario 200 involves a UE and a plurality of cells, which may be a part of a wireless communication network (e.g., an LTE network, an LTE-Advanced network, an LTE-Advanced Pro network, a 5G network, an NR network, an IoT network or an NB-IoT network). Cell A may be configured with a high priority and cell B may be configured with a low priority. The interference at cell A may be high and the interference at cell B may be low. The RSRP received from cell A may be high and the RSRP received from cell B may be low. It is assumed that the call drop rate at cell A is 99% and the call drop rate at cell B is 0%. When the UE is served by the highly interfered cell (e.g., cell A), the UE may suffer from the high call drop rate. Assuming that the UE is configured to perform the cell reselection based on the RSRP, the UE may stay at cell A since cell A is configured with higher priority and the RSRP of cell B may not meet the cell reselection criteria. The UE may not perform the cell reselection to leave cell A. However, the call drop rate at cell A is 99% while the call drop rate at cell B is 0%. In a case that the UE stays at cell A, the UE may suffer from the high interference and the high call drop rate. For better user experience, the UE should reselect to cell B under scenario 200.

FIG. 3 illustrates an example scenario 300 under schemes in accordance with implementations of the present disclosure. Scenario 300 involves a UE and a plurality of cells, which may be a part of a wireless communication network (e.g., an LTE network, an LTE-Advanced network, an LTE-Advanced Pro network, a 5G network, an NR network, an IoT network or an NB-IoT network). The UE may be configured to camp on a serving cell. The central frequency of the serving cell may be f1. The UE may be configured to receive the frequency information of a target cell from a broadcast channel of the serving cell. The central frequency of the target cell may be f2. The frequency information of the target cell may comprise at least one of the central frequency of the target cell, the measurement bandwidth of the target cell and the downlink bandwidth of the target cell. The measurement bandwidth may be received from the system information block (SIB) broadcasted by the serving cell. The measurement bandwidth may be the bandwidth configured by the serving cell for measuring the target cell. The downlink bandwidth of the target cell may be received from the master information block (MIB) broadcasted by the serving cell. The downlink bandwidth may be the real bandwidth of the target cell.

The UE may be configured to determine the overlapped bandwidth region between the serving cell and the target cell according to the frequency information. Specifically, the UE may be configured to determine the overlapped bandwidth region according to the downlink bandwidth (DL BW) of the serving cell and the measurement bandwidth (MEAS BW) of the target cell. For example, the UE may determine whether f1+1/2*DL BW is overlapped with f2−1/2*MEAS BW. In a case that the central frequency of the serving cell (e.g., f1) is close to the central frequency of the target cell (e.g., f2), the bandwidth of the serving cell may be overlapped with the bandwidth of the target cell. Once a part of bandwidth region between the serving cell and the target cell is overlapped, the interference may occur in the overlapped bandwidth region. Alternatively, the UE may be configured to determine the overlapped bandwidth region according to the downlink bandwidth of the serving cell and the downlink bandwidth of the target cell.

In some implementations, the frequency information of the target cell may be pre-stored in the UE. Specifically, once the UE receives the frequency information of a cell, the UE may store the frequency information of the cell in its database. For example, in a case that the UE ever camped on the target cell, the UE may store the central frequency and the downlink bandwidth of the target cell in its database. In a case that the UE ever received the frequency information of the target cell from a serving cell, the UE may also store the frequency information of the target cell in its database. The UE may use the pre-stored frequency information to determine the overlapped bandwidth region between the serving cell and the target cell.

In the overlapped bandwidth region, since the signals transmitted by the two cells are on the same frequency band, the signals may interfere with each other. The UE may need to consider the interference level of each cell in the overlapped bandwidth region. Therefore, after determining the overlapped bandwidth region, the UE may be configured to compare the signal quality of the serving cell in the overlapped bandwidth region with the signal quality of the target cell in the overlapped bandwidth region. The signal quality may comprise at least one of a RSRP, a reference signal received quality (RSRQ), a reference signal-signal to interference plus noise ratio (RS-SINR), or any other signal quality indicators. Since the interference may occur in the overlapped bandwidth region, the UE may be configured to compare which signal quality is better in the overlapped bandwidth region. The UE may determine the signal quality according to the reference signals received from the serving cell and the target cell. The signal quality of the reference signals received from the cells may reflect the interference level of the cells. The UE may be configured to choose the cell with better signal quality.

The UE may be configured to determine whether to perform a cell reselection according to the comparison result. For example, the UE may be configured to abort the cell reselection when the signal quality of the serving cell in the overlapped bandwidth region is greater than the signal quality of the target cell in the overlapped bandwidth region. Since the signal quality of the serving cell is better than the signal quality of the target cell, the interference or the call drop rate at the serving cell may be lower than the interference at the target cell. The UE should stay at the serving cell for better user experiences. Therefore, the UE may determine to stay at the serving cell and not to reselect to the target cell. In some implementations, a cell reselection criterion may be satisfied for reselecting to the target cell. For example, the RSRP received from the target cell may be higher than a threshold value or the priority of target cell may be higher than the priority of the serving cell. Even when the cell reselection criterion is satisfied, the UE may still determine to abort or abandon the cell reselection and stay at the serving cell.

In another example, the UE may be configured to trigger an out of service procedure to leave the serving cell when the signal quality of the target cell in the overlapped bandwidth region is greater than the signal quality of the serving cell in the overlapped bandwidth region. Since the signal quality of the target cell is better than the signal quality of the serving cell, the interference or the call drop rate at the target cell may be lower than the interference at the serving cell. The UE should reselect to the target cell for better user experiences. Therefore, the UE may determine to trigger the out of service procedure and perform the cell reselection to reselect to a better cell. In the out of service procedure, the UE may assume or pretend that the signal quality or the signal strength from the serving cell becomes very poor and the UE may not get services from the serving cell (e.g., out of service). In response to the out of service state, the UE may be forced to perform the cell reselection to regain services. Accordingly, even when the cell reselection criterion may not be satisfied, the UE may still be able to perform the cell reselection by triggering the out of service procedure. In some implementations, the cell reselection criterion may not be satisfied for reselecting to the target cell. For example, the RSRP received from the target cell may be lower than a threshold value or the priority of target cell may be lower than the priority of the serving cell. Even when the cell reselection criterion is not satisfied, the UE may still determine to perform the cell reselection to reselect to the target cell.

The above mentioned interference avoidance schemes may also be applicable to the cell selection procedure. The UE may be configured to determine whether a cell suffers from interference or has overlapped bandwidth region according to the frequency information of the cell. The frequency information of cells may be pre-stored in the UE. The UE may determine to lower the priority of the cell or not to select the cell with interference or overlapped bandwidth region when performing the cell selection procedure or the cell search. Accordingly, the UE may not select to the cell with interference or overlapped bandwidth region.

Illustrative Implementations

Figure 4:
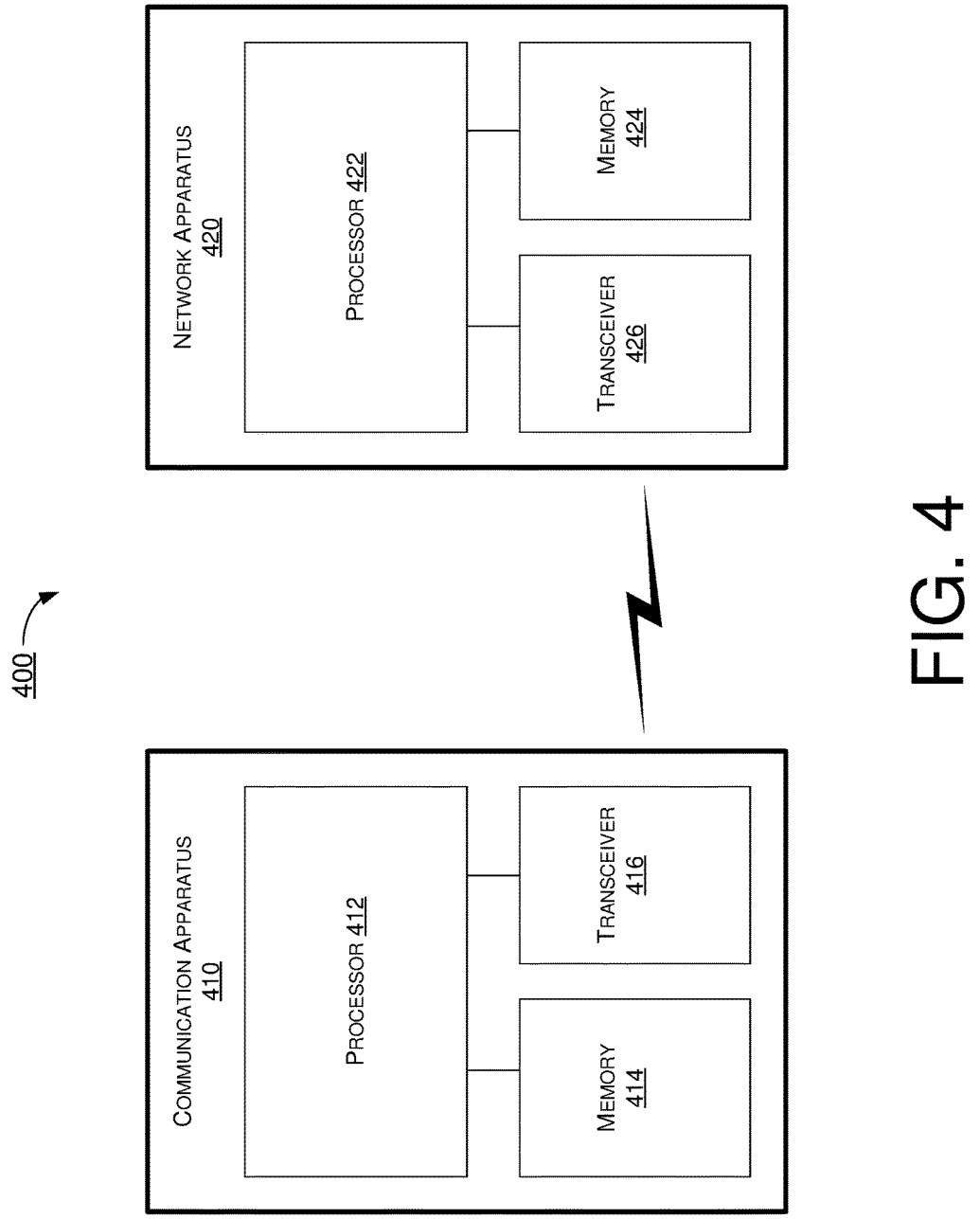
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to cell reselection with interference avoidance with respect to user equipment and network apparatus in wireless communications, including scenario 300 described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT or NB-IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in a LTE, LTE-Advanced or LTE-Advanced Pro network or in a gNB in a 5G, NR, IoT or NB-IoT network. Alternatively, network apparatus 420 may be implemented in the form of one or more IC chips such as, for example and without limitation, one or more single-core processors, one or more multi-core processors, or one or more CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may be configured to camp on network apparatus 420. Network apparatus 420 may be the serving cell of communication apparatus 410. The central frequency of network apparatus 420 may be f1. Processor 412 may be configured to receive, via transceiver 416, the frequency information of a target cell from a broadcast channel of network apparatus 420. The central frequency of the target cell may be f2. The frequency information of the target cell may comprise at least one of the central frequency of the target cell, the measurement bandwidth of the target cell and the downlink bandwidth of the target cell. Processor 412 may receive the measurement bandwidth from the SIB broadcasted by network apparatus 420. The measurement bandwidth may be the bandwidth configured by network apparatus 420 for measuring the target cell. Processor 412 may receive the downlink bandwidth of the target cell from the MIB broadcasted by network apparatus 420. The downlink bandwidth may be the real bandwidth of the target cell.

In some implementations, processor 412 may be configured to determine the overlapped bandwidth region between network apparatus 420 and the target cell according to the frequency information. Specifically, processor 412 may be configured to determine the overlapped bandwidth region according to the downlink bandwidth (DL BW) of network apparatus 420 and the measurement bandwidth (MEAS BW) of the target cell. For example, processor 412 may determine whether $f1+1/2*DL\ BW$ is overlapped with $f2-1/2*MEAS\ BW$. In a case that the central frequency of network apparatus 420 is close to the central frequency of the target cell, the bandwidth of network apparatus 420 may be overlapped with the bandwidth of the target cell. Once a part of bandwidth region between network apparatus 420 and the target cell is overlapped, the interference may occur in the overlapped bandwidth region. Alternatively, processor 412 may be configured to determine the overlapped bandwidth region according to the downlink bandwidth of network apparatus 420 and the downlink bandwidth of the target cell.

In some implementations, the frequency information of the target cell may be pre-stored in memory 412 of communication apparatus 410. Specifically, once processor 412 receives the frequency information of a cell, processor 412 may store the frequency information of the cell in memory 412. For example, in a case that communication apparatus 410 ever camped on the target cell, processor 412 may store the central frequency and the downlink bandwidth of the target cell in memory 412. In a case that processor 412 ever received the frequency information of the target cell from network apparatus 420, processor 412 may also store the frequency information of the target cell in memory 412. Processor 412 may use the pre-stored frequency information to determine the overlapped bandwidth region between network apparatus 420 and the target cell.

In some implementations, processor 412 may need to consider the interference level of each cell in the overlapped bandwidth region. Therefore, after determining the overlapped bandwidth region, processor 412 may be configured to compare the signal quality of network apparatus 420 in the overlapped bandwidth region with the signal quality of the target cell in the overlapped bandwidth region. The signal quality may comprise at least one of a RSRP, a RSRQ, a RS-SINR, or any other signal quality indicators. Since the interference may occur in the overlapped bandwidth region, processor 412 may be configured to compare which signal quality is better in the overlapped bandwidth region. Processor 412 may determine the signal quality according to the reference signals received from network apparatus 420 and the target cell. The signal quality of the reference signals received from the cells may reflect the interference level of the cells. Processor 412 may be configured to choose the cell with better signal quality.

In some implementations, processor 412 may be configured to determine whether to perform a cell reselection according to the comparison result. For example, processor 412 may be configured to abort the cell reselection when the signal quality of network apparatus 420 in the overlapped bandwidth region is greater than the signal quality of the target cell in the overlapped bandwidth region. Since the signal quality of network apparatus 420 is better than the signal quality of the target cell, the interference or the call drop rate at network apparatus 420 may be lower than the interference at the target cell. Processor 412 should stay at network apparatus 420 for better user experiences. Therefore, processor 412 may determine to stay at network apparatus 420 and not to reselect to the target cell.

In some implementations, a cell reselection criterion may be satisfied for reselecting to the target cell. For example, the RSRP received from the target cell may be higher than a threshold value or the priority of target cell may be higher than the priority of network apparatus 420. Even when the cell reselection criterion is satisfied, processor 412 may still determine to abort or abandon the cell reselection and stay at network apparatus 420.

In some implementations, processor 412 may be configured to trigger an out of service procedure to leave network apparatus 420 when the signal quality of the target cell in the overlapped bandwidth region is greater than the signal quality of network apparatus 420 in the overlapped bandwidth region. Since the signal quality of the target cell is better than the signal quality of network apparatus 420, the interference or the call drop rate at the target cell may be lower than the interference at network apparatus 420. Processor 412 should reselect to the target cell for better user experiences. Therefore, processor 412 may determine to trigger the out of service procedure and perform the cell reselection to reselect to a better cell. In the out of service procedure, processor 412 may assume or pretend that the signal quality or the signal strength from network apparatus 420 becomes very poor and processor 412 may not get services from network apparatus 420 (e.g., out of service). In response to the out of service state, processor 412 may be forced to perform the cell reselection to regain services. Accordingly, even when the cell reselection criterion may not be satisfied, processor 412 may still be able to perform the cell reselection by triggering the out of service procedure.

In some implementations, the cell reselection criterion may not be satisfied for reselecting to the target cell. For example, the RSRP received from the target cell may be lower than a threshold value or the priority of target cell may be lower than the priority of network apparatus 420. Even when the cell reselection criterion is not satisfied, processor 412 may still determine to perform the cell reselection to reselect to the target cell.

In some implementations, the above mentioned interference avoidance schemes may also be applicable to the cell selection procedure. Processor 412 may be configured to determine whether a cell suffers from interference or has overlapped bandwidth region according to the frequency information of the cell. The frequency information of cells may be pre-stored in memory 414. Processor 412 may determine to lower the priority of the cell or not to select the cell with interference or overlapped bandwidth region when performing the cell selection procedure or the cell search. Accordingly, processor 412 may not select to the cell with interference or overlapped bandwidth region.

Illustrative Processes

Figure 5:
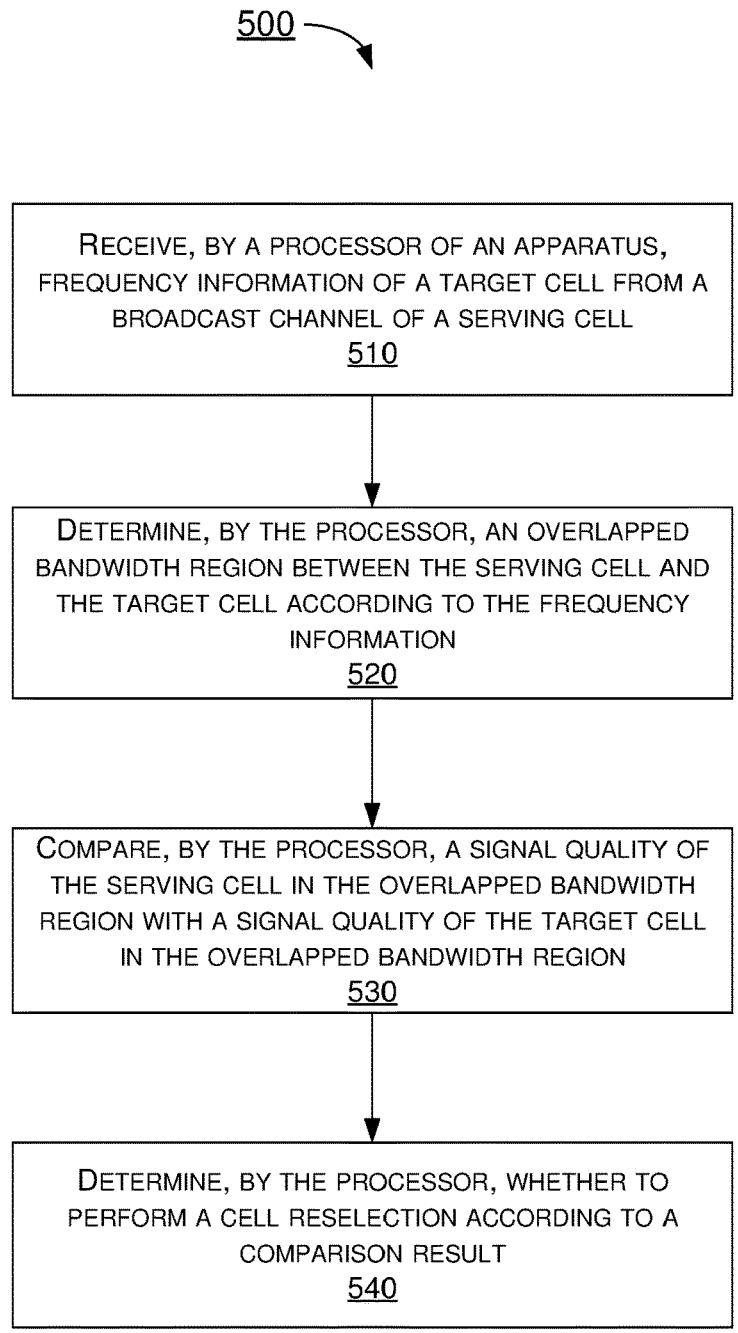
FIG. 5 is a flowchart of an example process in accordance with an implementation of the present disclosure.

FIG. 5 illustrates an example process 500 in accordance with an implementation of the present disclosure. Process 500 may be an example implementation of scenario 300, whether partially or completely, with respect to cell reselection with interference avoidance in accordance with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve processor 412 of communication apparatus 410 receiving frequency information of a target cell from a broadcast channel of a serving cell. Process 500 may proceed from 510 to 520.

At 520, process 500 may involve processor 412 determining an overlapped bandwidth region between the serving cell and the target cell according to the frequency information. Process 500 may proceed from 520 to 530.

At 530, process 500 may involve processor 412 comparing a signal quality of the serving cell in the overlapped bandwidth region with a signal quality of the target cell in the overlapped bandwidth region. Process 500 may proceed from 530 to 540.

At 540, process 500 may involve processor 412 determining whether to perform a cell reselection according to a comparison result.

In some implementations, process 500 may involve processor 412 aborting the cell reselection when the signal quality of the serving cell in the overlapped bandwidth region is greater than the signal quality of the target cell in the overlapped bandwidth region.

In some implementations, process 500 may involve processor 412 aborting the cell reselection when a cell reselection criterion is satisfied.

In some implementations, process 500 may involve processor 412 triggering an out of service procedure to leave the serving cell when the signal quality of the target cell in the overlapped bandwidth region is greater than the signal quality of the serving cell in the overlapped bandwidth region.

In some implementations, process 500 may involve processor 412 triggering the out of service procedure when a cell reselection criterion is not satisfied.

In some implementations, the signal quality may comprise at least one of a RSRP, a RSRQ, or a RS-SINR.

In some implementations, the frequency information of the target cell may comprise a measurement bandwidth of the target cell or a downlink bandwidth of the target cell.

In some implementations, process 500 may involve processor 412 determining the overlapped bandwidth region according to a downlink bandwidth of the serving cell and the measurement bandwidth of the target cell.

In some implementations, process 500 may involve processor 412 determining the overlapped bandwidth region according to a downlink bandwidth of the serving cell and the downlink bandwidth of the target cell.

In some implementations, the frequency information of the target cell may be pre-stored in communication apparatus 410.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, frequency information of a target cell from a broadcast channel of a serving cell;
   determining, by the processor, an overlapped bandwidth region between the serving cell and the target cell according to the frequency information;
   comparing, by the processor, a signal quality of the serving cell in the overlapped bandwidth region with a signal quality of the target cell in the overlapped bandwidth region; and
   determining, by the processor, whether to perform a cell reselection according to a comparison result,
   wherein the determining whether to perform the cell reselection according to the comparison result comprises:
   determining to abort the cell reselection responsive to the comparison result indicating the signal quality of the serving cell in the overlapped bandwidth region being greater than the signal quality of the target cell in the overlapped bandwidth region in spite of at least one cell reselection criteria being satisfied; and
   determining to perform the cell reselection responsive to the comparison result indicating the signal quality of the target cell in the overlapped bandwidth region being greater than the signal quality of the serving cell in the overlapped bandwidth region in spite of at least one cell reselection criteria not being satisfied.

2. The method of claim 1, further comprising:
   triggering, by the processor, an out of service procedure to leave the serving cell when the signal quality of the target cell in the overlapped bandwidth region is greater than the signal quality of the serving cell in the overlapped bandwidth region.

3. The method of claim 2, wherein the triggering comprises triggering the out of service procedure when a cell reselection criterion is not satisfied.

4. The method of claim 1, wherein the signal quality comprises at least one of a reference symbol received power (RSRP), a reference signal received quality (RSRQ), or a reference signal-signal to interference plus noise ratio (RS-SINR).

5. The method of claim 1, wherein the frequency information of the target cell comprises a measurement bandwidth of the target cell or a downlink bandwidth of the target cell.

6. The method of claim 5, wherein the determining the overlapped bandwidth region comprises determining the overlapped bandwidth region according to a downlink bandwidth of the serving cell and the measurement bandwidth of the target cell.

7. The method of claim 5, wherein the determining the overlapped bandwidth region comprises determining the overlapped bandwidth region according to a downlink bandwidth of the serving cell and the downlink bandwidth of the target cell.

8. The method of claim 1, wherein the frequency information of the target cell is pre-stored in the apparatus.

9. An apparatus, comprising:
a transceiver capable of wirelessly communicating with a plurality of cells of a wireless network; and
a processor communicatively coupled to the transceiver, the processor capable of:
receiving, via the transceiver, frequency information of a target cell from a broadcast channel of a serving cell;
determining an overlapped bandwidth region between the serving cell and the target cell according to the frequency information;
comparing a signal quality of the serving cell in the overlapped bandwidth region with a signal quality of the target cell in the overlapped bandwidth region; and
determining whether to perform a cell reselection according to a comparison result,
wherein the determining whether to perform the cell reselection according to the comparison result comprises:
determining to abort the cell reselection responsive to the comparison result indicating the signal quality of the serving cell in the overlapped bandwidth region being greater than the signal quality of the target cell in the overlapped bandwidth region in spite of at least one cell reselection criteria being satisfied; and
determining to perform the cell reselection responsive to the comparison result indicating the signal quality of the target cell in the overlapped bandwidth region being greater than the signal quality of the serving cell in the overlapped bandwidth region in spite of at least one cell reselection criteria not being satisfied.

10. The apparatus of claim 9, wherein the processor is further capable of:
triggering an out of service procedure to leave the serving cell when the signal quality of the target cell in the overlapped bandwidth region is greater than the signal quality of the serving cell in the overlapped bandwidth region.

11. The apparatus of claim 10, wherein, in the triggering, the processor is further capable of triggering the out of service procedure when a cell reselection criterion is not satisfied.

12. The apparatus of claim 9, wherein the signal quality comprises at least one of a reference symbol received power (RSRP), a reference signal received quality (RSRQ), or a reference signal-signal to interference plus noise ratio (RS-SINR).

13. The apparatus of claim 9, wherein the frequency information of the target cell comprises a measurement bandwidth of the target cell or a downlink bandwidth of the target cell.

14. The apparatus of claim 13, wherein, in the determining the overlapped bandwidth region, the processor is further capable of determining the overlapped bandwidth region according to a downlink bandwidth of the serving cell and the measurement bandwidth of the target cell.

15. The apparatus of claim 13, wherein, in the determining the overlapped bandwidth region, the processor is further capable of determining the overlapped bandwidth region according to a downlink bandwidth of the serving cell and the downlink bandwidth of the target cell.

16. The apparatus of claim 9, wherein the frequency information of the target cell is pre-stored in the apparatus.

* * * * *